Feb. 23, 1971           G. S. LIGHT           3,565,767
METHOD AND APPARATUS FOR REMOVING DISSOLVED
IMPURITIES FROM WATER

Filed June 10, 1968           3 Sheets-Sheet 1

INVENTOR.
GEORGE S. LIGHT
BY
Lindsey, Prutzman and Hayes
ATTORNEYS

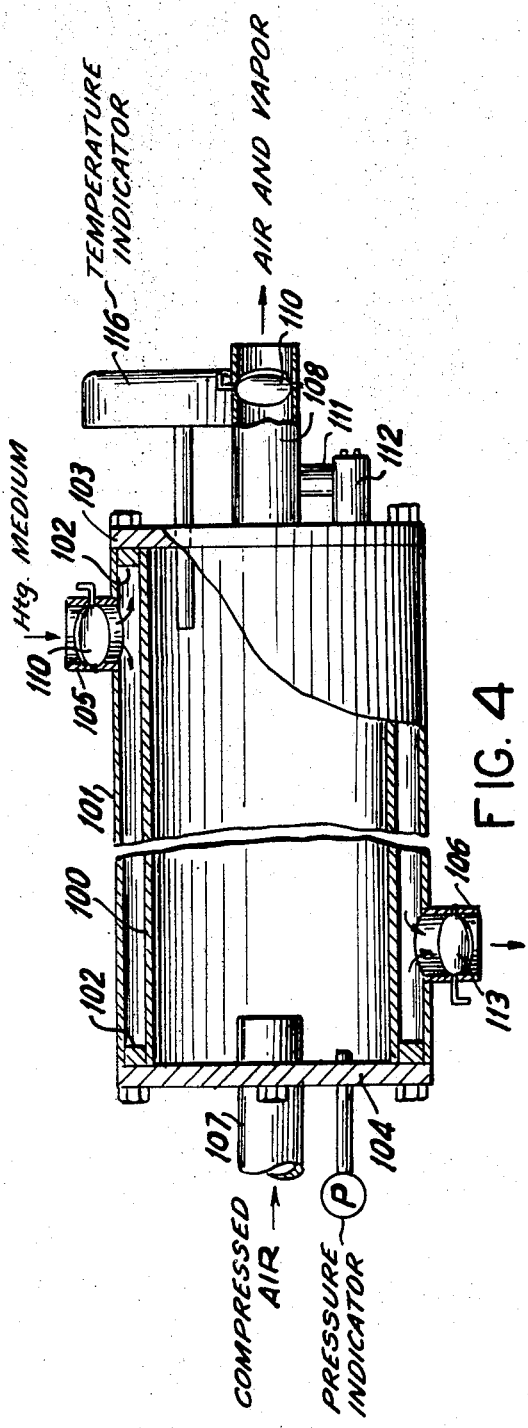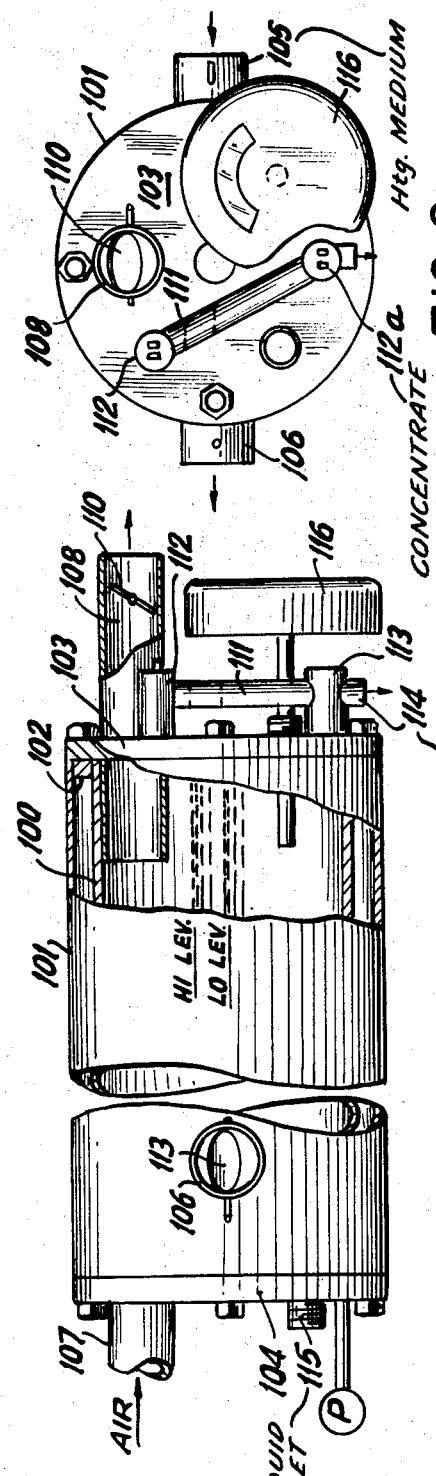

United States Patent Office 3,565,767
Patented Feb. 23, 1971

3,565,767
METHOD AND APPARATUS FOR REMOVING DISSOLVED IMPURITIES FROM WATER
George S. Light, Winsted, Conn. (% Polycom Corporation, 170 Lake St., Winsted, Conn. 06098)
Continuation-in-part of application Ser. No. 439,047, Mar. 11, 1965. This application June 10, 1968, Ser. No. 735,790
Int. Cl. B01d 3/34
U.S. Cl. 203—11          13 Claims

ABSTRACT OF THE DISCLOSURE

A pressurized evaporation method and apparatus for obtaining purified water from saline solutions comprises feeding a supply of the solution into a substantially closed vessel in a quantity sufficient to provide an evaporating surface and a space above that surface, applying a positive air pressure to the evaporating surface by feeding pressurizing air into the air space; causing water to pass into the pressurizing space from the solution as an evaporate by heating the solution, the pressurization being operative to suppress boiling or vapor formation within the body of the solution; controllably releasing the evaporate from the air space and condensing it as purified water.

---

This application is a continuation-in-part of my copending U.S. patent application Ser. No. 439,047, filed Mar. 11, 1965, now abandoned.

BRIEF DESCRIPTION OF THE INVENTION

The present invention relates generally to a method and apparatus for generating a condensible evaporate. More particularly it relates to a new and improved evaporation method and apparatus having particular utility in the demineralization of saline waters and the recovery of usable water therefrom.

It is an object of the present invention to provide a new and improved method and apparatus which facilitates evaporation of the volatile component of a solution from the evaporating surface thereof while suppressing the undesirable formation of vapor bubbles or boiling within the body of the solution and particularly at the heating surfaces contacted by the solution.

Another object of the present invention is to provide a new and improved method and apparatus of the type described which utilizes a positive air pressure acting against the evaporating surface to suppress undesirable boiling and vapor bubble formation at the heating surfaces for the liquid without adversely affecting the evaporation of the liquid at its evaporating surface.

Still another object of the present invention is to provide a new and improved method and apparatus of wide practical utility which is particularly well suited for producing fresh water from solutions containing scale forming materials by a change of state technique while obviating the deposition of hard scale on the heating surfaces used to heat the solution.

A further object of the present invention is to provide a method and apparatus of the type described which permits the generation of an evaporate over a wide range of temperature conditions heretofore considered either uneconomical, impractical or impossible without scale accumulation.

Other objects will be in part obvious and in part pointed out more in detail hereinafter.

These and related objects are effectuated in accordance with the present invention by feeding a quantity of pressurized air into contact with the evaporating surface of a solution containing scale forming ingredients to provide a positive air pressure acting on the evaporating surface. In this manner the solution is pressurized and the pressurized liquid may then be heated without causing boiling or internal vapor formation at the heating surfaces. An increased solution temperature will promote increased evaporation or volatilization of the liquid into the air space above the evaporating surface of the solution. The evaproate may then flow to a separate condensation area where the evaporate is returned to its liquid form in the absence of the scale-forming contaminants.

The invention accordingly comprises the several steps and the relation of one or more of such steps with respect to each of the others and the features of construction, combination of elements and arrangement of parts which will be exemplified in the construction hereafter set forth and the scope of the application which will be indicated in the appended claims.

BRIEF DESCRIPTION OF THE DRAWINGS

In the drawings:

FIGS. 4, 5 and 6 are plan, elevation and end views, respectively, of an evaporator in accordance with the present invention.

For ease of illustration and clarity of understanding the method and apparatus of the present invention will be described hereinafter in connection with the desalinization of sea water.

DESCRIPTION OF A PREFERRED EMBODIMENT

Figure 1:
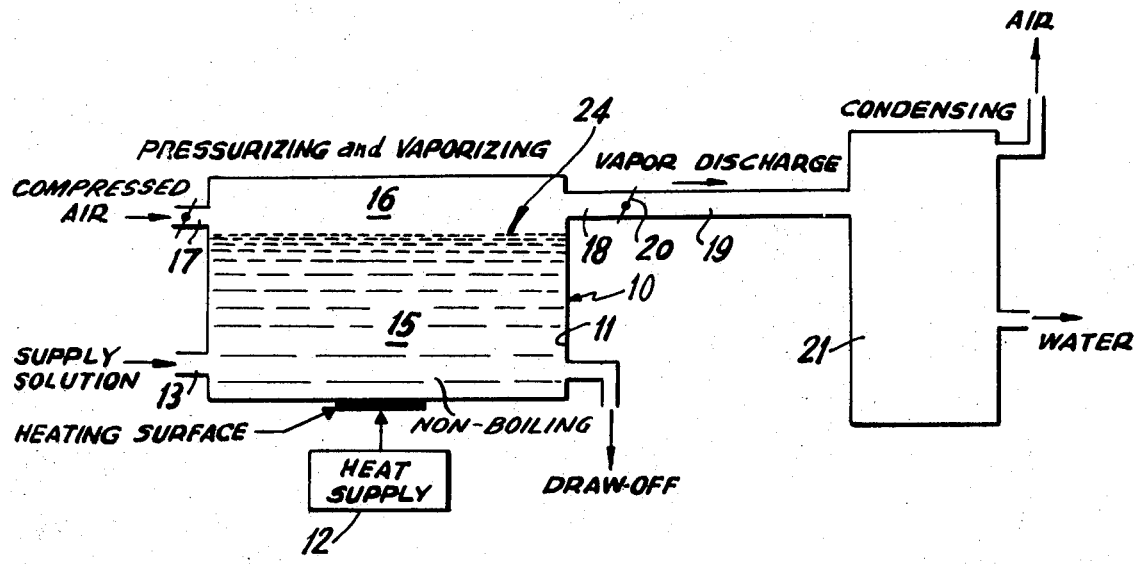
FIG. 1 is a schematic illustration of an evaporating and condensing apparatus in accordance with the present invention intended to operate over a wide range of pressures in response to the operating temperatures selected.
Figure 2:
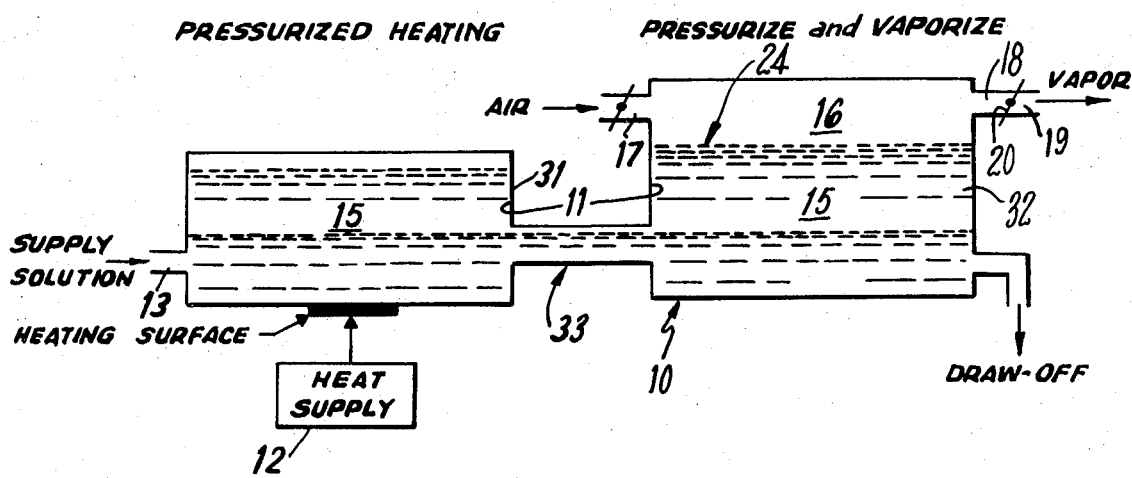
FIG. 2 is a schematic illustration of an evaporating apparatus similar to FIG. 1 with the heating operation located in a remote compartment from the evaporating surface.

Referring now to the drawings in greater detail and particularly to FIGS. 1 and 2 thereof wherein like reference numerals indicate like parts, a pressurizable evaporator, generally designated by the numeral 10 and preferably constructed from a corrosion resistant material such as stainless steel, is shown defining an evaporation chamber 11 designed so that heat can be applied thereto from a suitable heat source 12. The temperatures within the evaporator 10 and particularlly at the heating surfaces in contact with the solution can be controlled in any suitable fashion and may include a temperature sensing unit within the chamber 11 adapted to control the temperature of the saline solution. The chamber 11 is provided with a saline water inlet port 13 for supplying a volume of water 15 which is less than the total volume of the evaporating chamber. In this manner there is provided a pressurizable evaporating space 16 within the evaporating chamber above the evaporating surface 24 of the sea water 15. An air inlet port 17 communicates with the pressurizable evaporating space 16 of the chamber 11 while an escape port 18 for the evaporate also communicates with the space 16 at a location remote from inlet port 17. Air may be controllably supplied through the inlet port 17 to the space 16 by suitable air source having the ability to effect a positive static pressure component on the evaporating surface 24. A conduit 19 having a controllable throttle valve 20 therein is connected to the escape port 18 to permit the evaporate to controllably flow to a suitable condenser 21 (FIG. 1) where it is returned to its liquid form.

In order to enhance the rate of evaporation the evaporator 10, as mentioned, is suitably connected to a heat source 12. However, as shown in FIG. 2, the heating operation may be located remotely from the pressurized evaporating space 16. Thus, the chamber 11 is illustrated in FIG. 2 as being provided with a heating compartment 31 and an evaporating compartment 32, the compartments being interconnected by the liquid conduit 33 positioned adjacent the bottom of the compartments. The heating compartment 31 is positioned entirely below the level of the evaporating surface 24 so that it is completely filled with saline solution via the inlet port 13. It will be appreciated that any pressure applied to the evaporating surface 24 will be transmitted through the entire solution to all portions thereof even though it may be located in a separate but connected compartment remote from the pressurized air space 16.

In operation, after an appropriate volume of sea water has been admitted into the evaporator so as to provide an evaporating surface 24 at the desired level with an overlying pressurizable evaporating space 16, air is fed through the port 17 to provide a positive static air pressure against the evaporating surface 24 and consequently through the entire volume of sea water within the chamber 11. The pressurized solution is then heated by the heat source 12 to an elevated temperature causing the volatile component of the solution, viz, water, at the evaporating surface 24 to pass into the space 16 as an evaporate. The evaporate rapidly fills the space 16 and if throttle valve 20 remains closed, the space 16 assumes a saturated condition at which an equilibrium is established between the amount of volatile liquid evaporating into the space and the amount of evaporate condensing back into the saline solution. It will be appreciated that during the evaporation process boiling and vapor formation within the liquid will be suppressed and prevented by the static pressure acting on surface 24. Thus, when the heating is provided in the form of coils immersed in the solution to be heated, boiling and vapor formation is positively prevented at the outer surfaces of the coils. Similarly, where heat is applied externally of the vessel, vapor formation is suppressed at the walls of the container with which the solution to be heated is in contact. Under these controlled conditions of heating, the water in its evaporate form leaves the evaporating surface 24 and enters a space 16. Thereafter, it is collected and condensed within condenser 21 to provide fresh, demineralized water.

It has been observed that the temperature of the heating surfaces in contact with the liquid, such as the surfaces of the coils or walls of the vessel, determine the desired pressure of the liquid at the heating surfaces, and, accordingly, the appropriate static pressure component to be applied to the evaporating surface of the liquid. By static pressure component is meant any positive pressure applied to the evaporating surface of the saline water in the vessel. It will be appreciated that the pressure actually applied to the evaporating surface must be greater than the pressure for saturated air at the temperature employed in order to avoid vapor or bubble formation within the solution and particularly at the heating surface in contact with the saline solution. Accordingly, the density of the air pressing against the evaporating surface is at least 0.5% greater than the density of the air outside the evaporator.

This invention advantageously utilizes the pressure-temperature relationship as respects the boiling or vapor bubble formation of liquids, especially as regards water, and provides for the application of the appropriate pressure, having regard to the temperature of the heating surfaces to insure that vapor or bubbles do not form at the heating surfaces which are in contact with the liquid being heated. This invention permits, therefore, the use of higher operating temperatures such as temperatures above 170° F. and preferably above 200° F. As the temperature increases, the pressure to be applied as the static pressure component is increased in a controlled manner. By continuous control of the static pressure component on the water to be heated, vapor formation is suppressed, the dissolved mineral salts either remain in solution or settle as soft, easily removable sludge, and the accumulation of hard scale is prevented.

It will be appreciated that as the throttle valve 20 is opened after the space 16 has reached an equilbrium or saturated condition, the saturated evaporate will flow through conduit 19 toward the condenser 21. A condition of unsaturation thereby will result within the pressurized evaporating space 16 above the evaporating surface. This imbalance permits additional quantities of water to evaporate at the evaporating surface 24. However, due to the rapid generation of evaporate and the relatively slow diffusion of the pressurizing air between the inlet port 17 and the remote escape port 18, a minimum consumption of air takes place and a major portion of the effluent passing through the port 18 consists of the evaporated liquid from the saline solution. It will, of course, be appreciated that the pressure within the evaporating space will be maintained by air from inlet port 17 so as to suppress any vapor formation within the body of the saline solution and prohibit the boiling of the solution and the undesirable formation of scale on the heating surfaces of the evaporator. Consequently, the air supplied to space 16 is adjusted to adequately meet the pressure requirements of the system having regard to economies and efficiencies.

Figure 3:
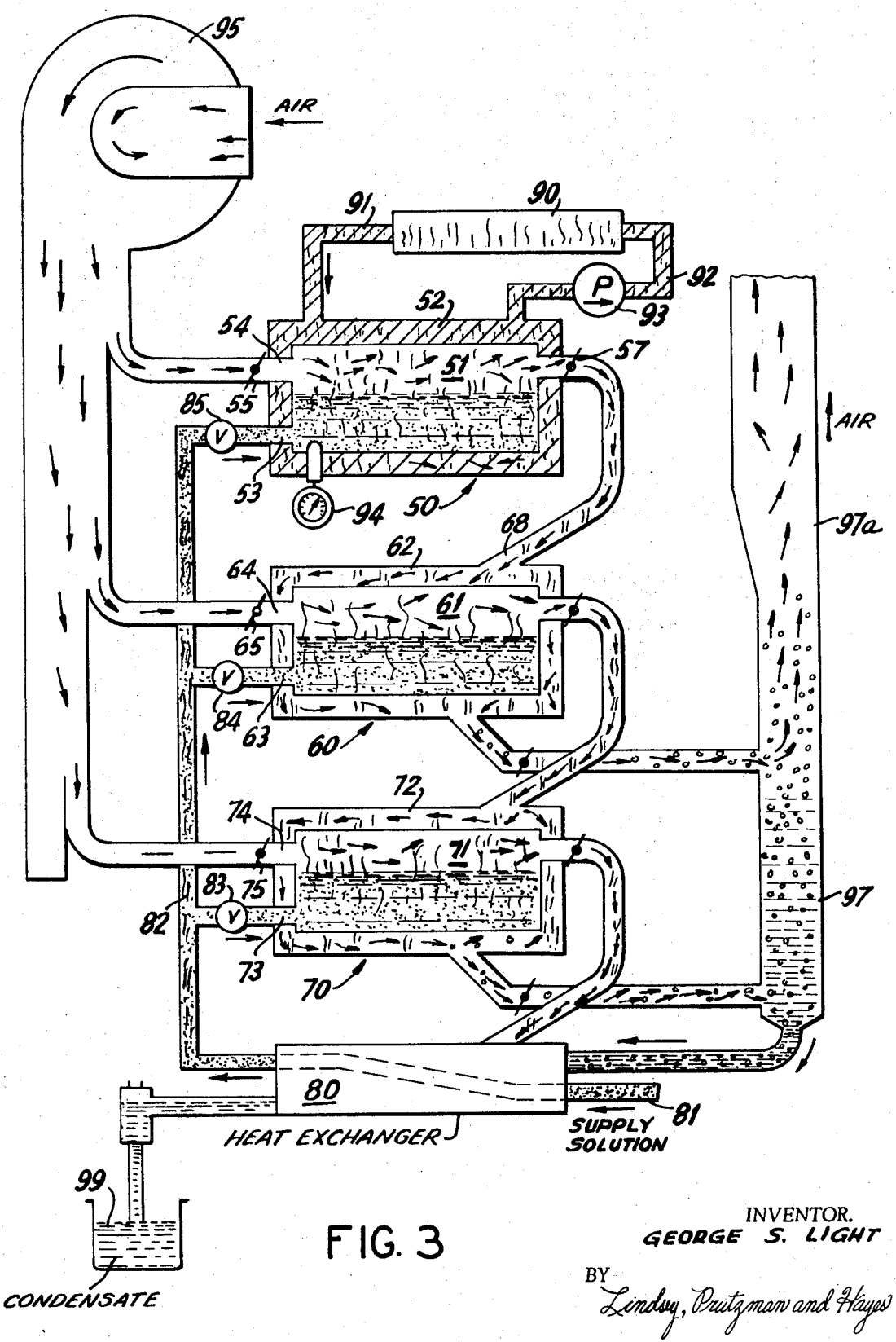
FIG. 3 is a schematic illustration of a multiunit evaporating system in accordance with the present invention.

It has long been recognized that economies can be effectuated in saline conversion units by placing such units in series so as to more fully utilize the heating and cooling cycles of the system. FIG. 3 exemplifies a manner in which the present invention may be adapted to multiple unit operation for this purpose. As clearly shown, the multiple unit system employs a plurality of substantially identical evaporators 50, 60 and 70, which operate in much the same manner as described hereinbefore with respect to evaporator 10 of FIGS. 1 and 2 with the exception that the evaporate from the first evaporator 50 is used as a source of heat for succeeding evaporator unit 60 while at the same time the subsequent evaporators act as condensers for the immediately preceding evaporator. In such a system it is a particular advantage of the present invention that the pressure within each evaporating chamber can be varied to accommodate progressively lower operating temperatures within the evaporators downstream from the primary heat source. Thus, the first evaporator unit 50 within the system will be supplied with heat from an outside source designated by the numeral 90. The individual units 50, 60 and 70 each include inner and outer cylindrical containers forming evaporating chambers 51, 61 and 71 with surrounding heating chambers 52, 62, 72, respectively. The saline supply solution enters chambers 51, 61, 71 via entrance ports 53, 63, 73 from the common supply line 82 while pressurizing air may enter the respective evaporating chambers via entrance ports 54, 64 and 74 to provide the desired pressurized condition within each evaporator.

In this system heat is conveyed from the primary heat source 90 via the conduit 91 to the first heating chamber 52 under the driving force of pump 93 located within the return conduit 92, the resultant temperature being measured by a suitable temperature sensing and indicating device 94 contacting the saline solution within the evaporating chamber 51. Pump 93 and heater unit 90 can be controlled by conventional regulating systems which maintain the desired temperature indicated by sensing device 94. The evaporate developed within evaporator 50 will be controllably released by throttle valve 57 to pass through conduit 68 to the heating chamber 62 of the succeeding evaporator 60 where it will provide the necessary heat for the evaporation of the saline solution contained within the pressurizable evaporating chamber 61 thereof. The evaporate from evaporator 50 will impart sufficient heat to evaporator 60 to convert the evaporate back to its liquid form for recovery a collector 97. The evaporate from the evaporator 60 is used in a similar manner to heat the saline solution within the succeeding evaporator 70, wherein the evaporation and condensation processes proceed in much the same manner as in the preceding evaporators. However, the pressure within each pressurized evaporating space is adjusted to accommodate for the heat loss within the system and for the lower temperatures in each succeeding evaporator.

As a manner of alleviating part of the heat drain on the system the saline solution supplied from conduit 81 to the common supply pipe 82 is preheated by first flowing through a heat exchanger 80 which also acts as a condenser for the evaporate from chamber 71. The supply solution is fed from the heat exchanger 80 through a conduit 82, and then through valves 83, 84 and 85 into the individual evaporating chambers via entrance ports 73, 63 and 53, respectively. Valves 83, 84 and 85 are adjusted to obtain the desired flow rate through unit 80 and to maintain the desired liquid level in the evaporating chambers.

It is desirable that the air supply for each evaporator be individually controlled. Accordingly, a blower or air pump 95 is employed to supply a quantity of pressurized air to the evaporators' air inlet ports 54, 64 and 74. The pressure of the air is controlled by adjusting throttle valves 55, 65 and 75, respectively. The quantity of air is preferably adjusted so that the pressure within the evaporating space is just above the saturation pressure of steam for the saline water temperature at the heating surface. The air which passes through the evaporators flows toward enlarged end 97a of collector 97, which serves as an exhaust for such air. Collector 97 also extends through condenser 80 to effect further cooling of the purified water after which it is collected within trough 99.

The various valves in the system should be adjusted so that the operating temperature for evaporation chamber 61 is as near as possible to 51, but some heat losses will tend to make it lower. The air supply must be reduced via valve 65 to permit the pressure in chamber 61 to be somewhat higher than the saturation pressure corresponding to the temperature within heating chamber 62. A similar adjustment will, of course, be made at valve 75 of evaporator 70.

If desired, additional evaporation stages or units may be utilized to obtain maximum benefit of the heat within the system. As will be appreciated, each stage transmits to the next succeeding stage a slightly cooler evaporate, with the decrease in temperature attributable principally to the heat of the water removed in the prior stage, and, in part, due to unavoidable heat losses. It is contemplated that as much as five times the amount of demineralized water produced in the first stage may be obtained by a multistage system operated in series.

Referring now to FIGS. 4 through 6, there is illustrated a more detailed construction of the apparatus employed in accordance with the present invention, this structure includes a pair of coaxial cylinders 100 and 101 separated by a pair of annular spacers 102 located near the opposite ends of the cylinders. A pair of circular end plates 103 and 104 are bolted to the annular spacers and sealed with respect to cylinders 100 and 101. The space within the inner cylinder 100 forms the evaporation chamber and the space between the cylinder 100 and cylinder 101 forms the heating chamber.

A pair of cylindrical nipples 105 and 106 are mounted in outer cylinder 101 to form the entrance and exit ports for the heating chamber. These nipples are located on opposite sides and at opposite ends so that the heating medium will tend to flow through the entire heating chamber. A pair of cylindrical nipples 107 and 108 are mounted in the upper portion of end plates 104 and 103, respectively, so that they pass through the end plates and into the evaporation chamber. Nipple 108 forms the exit port for the evaporator. Throttle valves 110 are mounted in nipples 105–108 to control the various flow rates and pressures within the chambers.

A threaded water inlet nipple 115 is mounted in end plate 104. A glass liquid level indicator is mounted on end plate 103 and includes a glass tube 111 coupled between a pair of cylindrical extensions 112 and 113 which communicate with the evaporation chamber. Extension 112 passes through the upper portion of the end plate, and extension 113 passes through the lower center portion. An outlet 114 is coupled to extension 113 to provide a port discharging solution from the chamber. A temperature indicating device 116 is mounted on end plate 103 and extends into the solution within the vapor chamber near the heater shell to measure the solution temperature near the shell.

While only a few illustrative examples have been discussed in detail, it should be obvious that there are numerous possible variations of the method and apparatus without departing from the scope and spirit of the invention. Thus, the invention may be applied to the separation of other liquid systems into one or more of its components, or, if desired, may be used to remove one or more components from a liquid system to obtain a more concentrated solution with respect to the components not removed.

I claim:

1. In a method for evaporating a volatile component of a supply solution containing nonvolatile scale forming constituents without deposition of substantial amounts of scale on a solid heating surface in contact with the supply solution, the steps comprising:
 (a) providing an enclosed pressurizing and evaporating space above the evaporating top surface of the supply solution at a location downstream from the solid heating surface in contact with the solution;
 (b) subjecting the evaporating top surface of the solution to a positive pressure of water-unsaturated air from above said surface to pressurize the evaporating top surface and the supply solution in contact with the solid heating surface;
 (c) supplying heat to the solid heating surface in contact with the supply solution, the heat being supplied from a source out of contact with the solution, the positive air pressure acting on the evaporating surface being sufficient to avoid boiling on the evaporating surface and to prevent formation of scale on the solid heating surface at its operating temperature and the pressure at the solid heating surface being greater than the pressure of saturated vapor at the operating temperature employed at the solid heating surface;
 (d) evaporating the solution at the evaporating top surface to provide a vapor adjacent said evaporating surface; and
 (e) controllably flowing the vapor away from said evaporating surface while maintaining said positive air pressure.

2. The method of claim 1 wherein the vapor and air are directed to a condenser and the vapor condensed to a substantially pure liquid.

3. The method of claim 1 wherein the pressurized supply solution is heated to a temperature of at least 170° F.

4. The method of claim 1 wherein the air pressurizing the evaporating surface has a density at least 0.5% greater than the density of the ambient air.

5. The method of claim 1 wherein the supply solution is water having a high mineral salt content and the vapor generated from the supply solution is substantially pure water.

6. The method of claim 5 wherein the supply solution has a mineral salt content equivalent to sea water.

7

7. The method of claim 1 including the steps of:
(a) providing a substantially closed evaporation chamber;
(b) partially filling said chamber with a volume of supply solution less than the volume of the chamber to provide the evaporating top surface on said supply solution and a pressurizing and evaporating space above and in contact with said evaporating top surface; and
(c) heating the pressurized solution to an elevated temperature in the absence of boiling to enhance formation of the vapor at the evaporating top surface.

8. The method of claim 7 wherein the pressurized supply solution is heated at a location remote from the evaporating top surface.

9. The method of claim 8 wherein a portion of the supply solution being heated is located in a compartment separated from the evaporating top surface.

10. The method of claim 7 wherein the evaporate removed from the pressurizing and evaporating space is directed to a condenser and condensed to obtain a substantially pure liquid.

11. The method of claim 10 wherein the condenser includes an additional evaporation chamber partially filled with supply solution, said additional chamber being independently pressurized by a positive air pressure directed against the top surface of the supply solution located therein.

12. An apparatus for evaporating a volatile component of a supply solution containing scale forming constituents without formation of substantial amounts of scale comprising:
(a) a substantially enclosed evaporation chamber;
(b) a supply solution inlet for controllably feeding to the evaporation chamber a volume of solution at a volumetric rate sufficient to provide an evaporating surface and a pressurizing and evaporating space above said surface;
(c) the evaporation chamber including a solid heating surface positioned below the evaporating surface of the supply solution and in contact with the the solution, the heat being supplied from a source out of contact with the solution;

8

(d) a controllable air inlet directly communicating with the pressurizing and evaporating space for applying a positive air pressure to the evaporating surface from above said surface to suppress vapor formation within the supply solution;
(e) an air-vapor outlet communicating with the pressurizing and evaporating space at a location remote from the air inlet; and
(f) means at said air inlet and air-vapor outlet for controlling the air pressure within the evaporation chamber to provide a positive static pressure component of water-unsaturated air against the evaporating surface sufficient to avoid boiling on the evaporating surface and to prevent formation of scale on the heating surface and a pressure at the heating surface greater than the pressure of saturated vapor at the operating temperature employed at the heating surface.

13. The apparatus of claim 12 wherein the air pressure control means includes a throttle valve in said vapor outlet to control the flow of evaporate away from the pressurizing and evaporating space.

References Cited

UNITED STATES PATENTS

| | | | |
|---|---|---|---|
| 236,940 | 1/1881 | Faesch | 159—24 |
| 1,546,345 | 7/1925 | Laird | 203—22 |
| 3,284,318 | 11/1966 | Coanda | 202—160 |
| 3,334,026 | 8/1967 | Dobell | 203—10 |
| 1,183,142 | 5/1916 | Underwood | 203—11 |
| 3,165,452 | 1/1965 | Williams | 203—11 |
| 3,289,733 | 12/1966 | Martin | 159—16AX |
| 3,285,834 | 11/1966 | Guerrieri | 203—11 |

FOREIGN PATENTS

| | | | |
|---|---|---|---|
| 376,619 | 7/1932 | Great Britain | 159—3 |

NORMAN YUDKOFF, Primary Examiner

J. SOFER, Assistant Examiner

U.S. Cl. X.R.

159—16; 203—49, 77, 80, 100